United States Patent [19]
Doong

[11] Patent Number: 5,846,294
[45] Date of Patent: Dec. 8, 1998

[54] PRESSURE SWING ADSORPTION PROCESS AND APPARATUS

[75] Inventor: Shain-Jer Doong, Millington, N.J.

[73] Assignee: The BOC Group, Inc., New Providence, N.J.

[21] Appl. No.: 842,124

[22] Filed: Apr. 23, 1997

[51] Int. Cl.⁶ .................................................. B01D 53/053
[52] U.S. Cl. .................................. 95/98; 95/101; 95/102; 95/105; 95/130; 96/130; 96/144
[58] Field of Search ................................ 95/96–105, 130; 96/130, 144

[56] References Cited

U.S. PATENT DOCUMENTS

| | | | |
|---|---|---|---|
| 3,142,547 | 7/1964 | Marsh et al. ................................ | 95/100 |
| 4,015,956 | 4/1977 | Münzner et al. ............................ | 95/96 |
| 4,160,651 | 7/1979 | Pivard ......................................... | 95/97 |
| 4,381,189 | 4/1983 | Fuderer ....................................... | 95/100 |
| 4,512,778 | 4/1985 | Simonet et al. ............................ | 95/100 |
| 4,512,779 | 4/1985 | Haÿ ............................................. | 95/100 |
| 4,781,735 | 11/1988 | Tagawa et al. ............................. | 95/101 |
| 4,816,039 | 3/1989 | Krishnamurthy et al. ................. | 95/97 |
| 4,981,499 | 1/1991 | Hay et al. ................................... | 95/100 |
| 5,032,150 | 7/1991 | Knaebel ..................................... | 95/98 X |
| 5,122,164 | 6/1992 | Hirooka et al. ............................ | 55/26 |
| 5,226,933 | 7/1993 | Knaebel et al. ............................ | 95/96 |
| 5,370,728 | 12/1994 | LaSala et al. .............................. | 95/101 |
| 5,464,467 | 11/1995 | Fitch et al. ................................. | 95/98 |
| 5,486,226 | 1/1996 | Ross et al. .................................. | 95/96 X |
| 5,518,526 | 5/1996 | Baksh et al. ............................... | 95/100 |
| 5,520,720 | 5/1996 | Lemcoff ..................................... | 95/96 |
| 5,529,607 | 6/1996 | Tan ............................................. | 95/100 X |
| 5,536,299 | 7/1996 | Girard et al. ............................... | 95/101 |
| 5,565,018 | 10/1996 | Baksh et al. ............................... | 95/100 |
| 5,620,501 | 4/1997 | Tamhankar et al. ....................... | 95/96 X |
| 5,656,068 | 8/1997 | Smolarek et al. .......................... | 95/105 X |
| 5,658,371 | 8/1997 | Smolarek et al. .......................... | 95/101 |
| 5,679,134 | 10/1997 | Brugerolle et al. ........................ | 95/96 |
| 5,702,504 | 12/1997 | Schaub et al. ............................. | 95/101 |

*Primary Examiner*—Robert Spitzer
*Attorney, Agent, or Firm*—Coleman R. Reap; Salvatore P. Pace

[57] ABSTRACT

A process and apparatus for separating the components of a gas mixture in a pair of adsorption vessels using a single gas compressor/pump to move gas into and out of the adsorption vessels. The cycle is such that the gas compressor/pump is in continuous operation. The adsorption cycle is non-symmetrical in that the series of steps carried out in one of the adsorbers is not the same as the series of steps carried out in the other adsorber. The apparatus includes an intermediate gas storage container which is used to temporarily store gas removed from the nonadsorbed gas outlet end of the adsorption vessels so that it can be used to partially pressurize the adsorption vessels upon completion of the adsorbent regeneration step of the adsorption cycle.

29 Claims, 4 Drawing Sheets

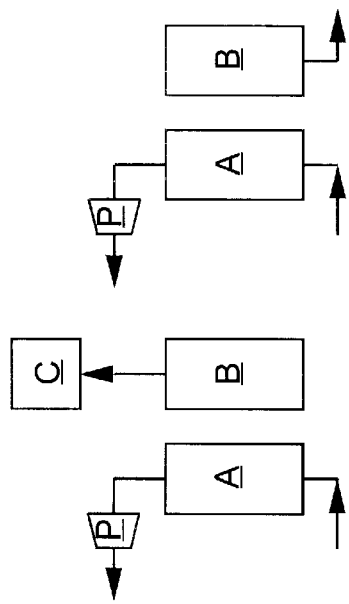
FIG. 3A
FIG. 3B
FIG. 3C
FIG. 3D
FIG. 3E
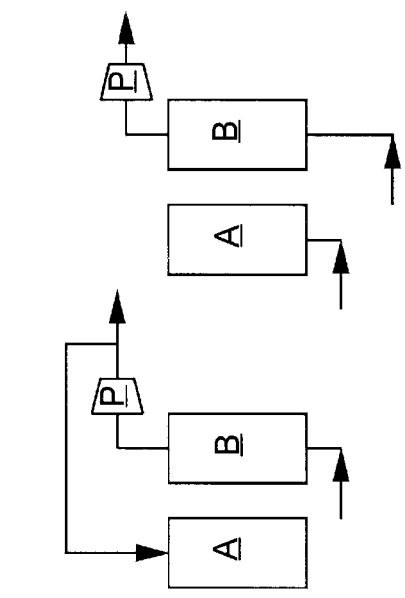
FIG. 3F
FIG. 3G
FIG. 3H
FIG. 3I
FIG. 3J

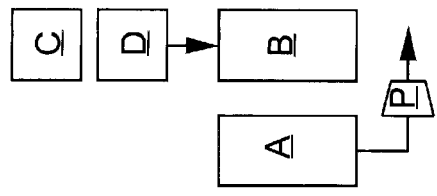
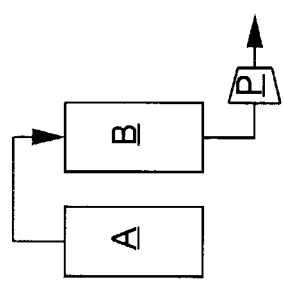
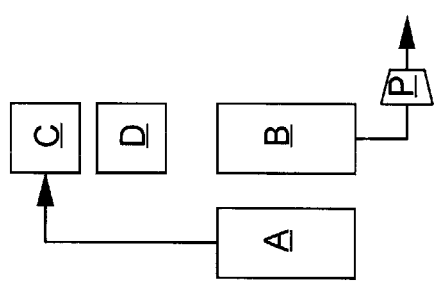
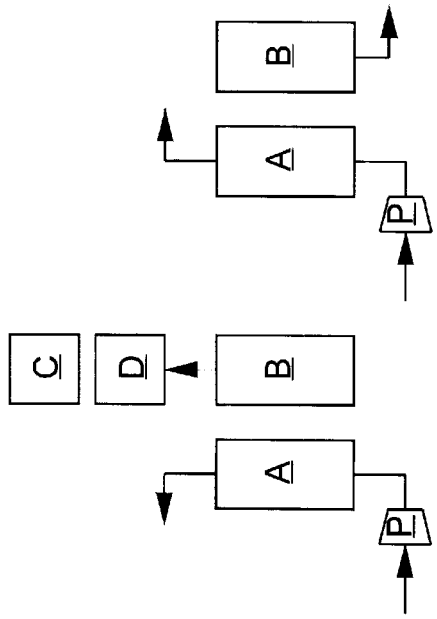
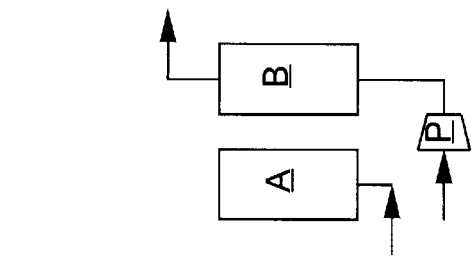
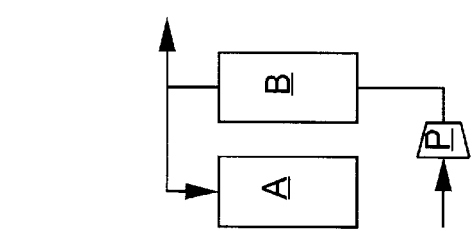
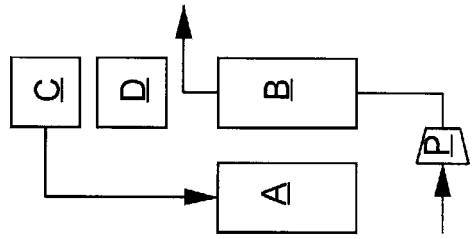
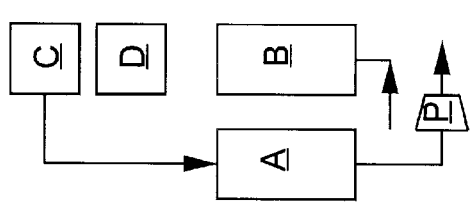

PRESSURE SWING ADSORPTION PROCESS AND APPARATUS

FIELD OF THE INVENTION

This invention relates to a process for the separation of the components of a gas mixture, and more particularly to the separation of gas components by a novel pressure swing adsorption process. The invention is especially well adapted to the separation of the components of air at pressures near atmospheric pressure.

BACKGROUND OF THE INVENTION

Pressure swing adsorption (PSA) processes are becoming increasingly more popular for the separation of gas mixtures containing two or more components at least one component of which is more strongly adsorbed by a selected adsorbent at elevated pressures than is at least one other component. The most basic processes comprise a cycle carried out in closed elongate vessels which contain a selected adsorbent and which have a feed gas inlet and a nonadsorbed product gas outlet. The cycle includes an adsorption step, during which a gas mixture is passed through one or more of the closed vessels in a cocurrent direction (from the feed gas inlet end towards the nonadsorbed product gas outlet end) at an elevated pressure, thereby causing the more strongly adsorbed component to be selectively adsorbed and the less strongly adsorbed to be discharged from the adsorption vessel as nonadsorbed product gas; and an adsorbent regeneration step, during which process gas in the adsorption vessel is countercurrently (in the direction opposite to the cocurrent direction) removed therefrom, thereby reducing the pressure in the adsorption vessel and causing the more strongly adsorbed component to be desorbed from the adsorbent. The desorbed gas is discharged through the inlet end of the vessel and discarded as a waste gas or collected as a second product gas.

Over the years since the discovery of the basic adsorption cycle, various steps have been added to the cycle to improve the yield or purity of the gas product(s) of the process. Thus, to conserve energy and improve yield, bed equalization steps have been added to cycles in which two or more adsorption vessels are operated in parallel and out of phase, such that one or more vessels is in the adsorption mode while one or more other vessels are in the bed regeneration mode. Bed equalization comprises transferring gas from a vessel of the system which has just completed its adsorption step and contains gas at an elevated pressure to another vessel of the system which has just completed its bed regeneration step and is at a low pressure. A product backfill step has likewise been added to enhance the purity of the nonadsorbed product gas. During the product backfill step nonadsorbed product gas is passed countercurrently through the adsorption vessel, which causes strongly adsorbed gas to be forced toward the feed gas inlet end of the vessel. This minimizes or eliminates adulteration of the nonadsorbed product gas during the early stages of the following adsorption step of the cycle.

U.S. Pat. No. 5,122,164, issued to Hirooka et al., discloses a two bed PSA process having a cycle which features a purge step, in addition to a bed equalization step with optional bed evacuation and a product backfill step. The disclosure of this patent is incorporated herein by reference.

U.S. Pat. No. 5,536,299, issued to Girard et al., discloses a PSA process for gas separation in which the steps of cycle overlap the succeeding steps of the cycle. It is asserted that the disclosed cycle results in increased capacity and reduced power consumption.

U.S. Pat. No. 5,565,018, issued to Baksh et al., shows the production of oxygen from air using segregated external gas storage tanks.

The above processes include steps in which the feed gas compressor and the vacuum pump are not operated; accordingly these equipment units must be shut down or idled when they are not in use.

Efforts are continuously being made to improve the efficiency of PSA cycles by increasing the yield or enhancing the purity of the desired product or by reducing energy consumption during the process. Thus, U.S. Pat. No. 5,370,728, issued to LaSala et al., discloses a single adsorption vessel system which uses a single gas compressor to both charge feed gas into the adsorption vessel and to evacuate the vessel during bed regeneration.

It would be highly desirable to have a multibed process which operates more cost effectively and more efficiently. The invention disclosed herein accomplishes these objectives.

SUMMARY OF THE INVENTION

The present invention derives energy savings benefit from the use of a temporary storage tank to receive partially purified gas cocurrently discharged from the adsorption vessels of the system at pressures intermediate the nonadsorbed gas product pressure and the final evacuation pressure, and makes use of the gas contained in the temporary storage tank as a purge gas and as a partial repressurization gas for the adsorption vessels. In the case of an adsorption system comprising pairs of adsorption vessels, capital cost economy and additional energy economy are realized by the use of a single gas compressor/pump to both pressurize and evacuate the adsorption vessels of the system in a cycle which permits the compressor/pump to be in continuous service during the adsorption cycle.

In a broad embodiment, the invention comprises a process for producing first component-enriched gas from a feed gas containing first and second components in a system comprising at least one gas reservoir and at least two adsorption zones, each containing an adsorbent which selectively adsorbs the second component relative to the first component. The broad process comprises repeatedly performing the steps:

(i) producing first component-enriched gas in at least one adsorption zone of the system by cocurrently introducing feed gas thereinto and cocurrently removing first component-enriched gas therefrom, while partially depressurizing at least one other adsorption zone of the system by cocurrently removing gas therefrom and storing the removed gas in the gas reservoir;

(ii) partially depressurizing at least one adsorption zone by cocurrently transferring gas therefrom to the gas reservoir, while countercurrently removing second component-enriched gas from at least one other adsorption zone;

(iii) purging at least one adsorption zone of the system by transferring gas cocurrently out of at least one other adsorption zone and countercurrently into the adsorption zone(s) being purged in this step (iii) while countercurrently withdrawing gas from the at least one adsorption zone(s) being purged;

(iv) countercurrently removing second component-enriched gas from at least one adsorption zone, while partially pressurizing at least one other adsorption zone by countercurrently transferring gas thereinto from the gas reservoir;

(v) purging at least one adsorption zone of the system other than the adsorption zone(s) purged in step (iii) by countercurrently transferring gas thereinto from the gas reservoir and countercurrently removing second component-enriched gas from the at least one adsorption zone being purged in this step (v), while further pressurizing the adsorption zone(s) partially pressurized in step (iv) by cocurrently introducing feed gas thereinto;

(vi) partially pressurizing at least one adsorption zone of the system by countercurrently transferring gas thereinto from the gas reservoir, while producing first component-enriched gas by cocurrently introducing feed gas into at least one other adsorption zone other than the adsorption zone(s) in which first component-enriched gas was produced in step (i), and cocurrently removing first component-enriched gas therefrom; and (vii) further pressurizing the adsorption zone(s) partially pressurized in step (vi) by cocurrently introducing feed gas thereinto, while continuing to produce first component-enriched gas in the adsorption zone(s) in which first component-enriched gas was produced in step (vi) by cocurrently introducing feed gas thereinto and cocurrently removing first component-enriched gas therefrom.

In a preferred aspect of the above-described broad embodiment, the process further comprises, between steps (i) and (ii), the additional step of continuing to cocurrently produce first component-enriched product gas in the at least one adsorption zone preferred to in step (i), while countercurrently removing second component-enriched gas from the at least one other adsorption zone referred to in step (i).

In a more preferred aspect of the broad embodiment, the process additionally comprises, between steps (iv) and (v), the additional step of countercurrently removing second component-enriched gas from the at least one adsorption zone referred to in step (iv), while partially pressurizing the at least one other adsorption zone referred to in step (iv) by countercurrently introducing first component-enriched product gas thereinto, and between steps (vi) and (vii) the additional step of partially pressurizing the at least one adsorption zone referred to in step (vi) by countercurrently transferring first component-enriched product gas thereinto, while continuing to produce first component-enriched product gas in the at least one other adsorption zone referred to in step (vi) and cocurrently remove first component-enriched gas therefrom.

The process of the invention can be carried out in one or more pairs of adsorption zones or in three or more adsorption zones operated serially.

A preferred embodiment of the invention comprises carrying out the process of the invention in a system comprising a gas reservoir and one or more pairs of first and second adsorption zones, and with respect to each such pair of first and second adsorption zones, the steps of the process are:

(i) producing first component-enriched product gas by cocurrently introducing feed gas into the first adsorption zone and cocurrently removing first component-enriched gas therefrom, while partially depressurizing the second adsorption zone by cocurrently transferring gas therefrom to the gas reservoir;

(ii) partially depressurizing the first adsorption zone by cocurrently transferring gas therefrom to the gas reservoir, while countercurrently removing second component-enriched gas from the second adsorption zone;

(iii) purging the second adsorption zone by transferring gas cocurrently out of the first adsorption zone and countercurrently into the second adsorption zone while countercurrently removing second component-enriched gas therefrom;

(iv) countercurrently removing second component-enriched gas from the first adsorption zone, while partially pressurizing the second adsorption zone by countercurrently transferring gas thereinto from the gas reservoir;

(v) purging the first adsorption zone by countercurrently transferring gas thereinto from the gas reservoir and countercurrently removing gas from the first adsorption zone, while further pressurizing the second adsorption zone by cocurrently introducing feed gas thereinto;

(vi) partially pressurizing the first adsorption zone by countercurrently transferring gas thereinto from the gas reservoir, while producing first component-enriched product gas by cocurrently introducing feed gas into the second adsorption zone and cocurrently removing first component-enriched gas therefrom; and (vii) further pressurizing the first adsorption zone by cocurrently introducing feed gas thereinto, while continuing to produce first component-enriched product gas by cocurrently introducing feed gas into the second adsorption zone and cocurrently removing first component-enriched gas therefrom.

In a more preferred aspect of the embodiment of the invention carried out in one or more pairs of adsorption zones, the process further comprises, between steps (i) and (ii) the additional step of producing first component-enriched product gas by cocurrently introducing feed gas into the first adsorption zone and cocurrently removing first component-enriched gas therefrom, while countercurrently removing second component-enriched gas from the second adsorption zone. In a most preferred aspect of this embodiment, the process additionally comprises between steps (iv) and (v) the additional step of countercurrently removing second component-enriched gas from the first adsorption zone, while partially pressurizing the second adsorption zone by countercurrently transferring first component-enriched product gas thereinto, and between steps (vi) and (vii) the additional step of partially pressurizing the first adsorption zone by countercurrently transferring first component-enriched product gas thereinto, while producing first component-enriched product gas by cocurrently introducing feed gas into the second adsorption zone and cocurrently removing first component-enriched gas therefrom.

In the embodiment carried out in pairs of adsorption vessels, the feed gas is generally introduced into the second adsorption zone in step (v) and into the first adsorption zone in step (vii) at a first predetermined pressure, and the feed gas is generally introduced into the first adsorption zone in step (i) and into the second adsorption zone in steps (vi) and (vii) at a pressure which increases from the first predetermined pressure to a second predetermined pressure. The first predetermined pressure is preferably in the range of about 0.6 to about 2 bara, the second predetermined pressure is preferably in the range of about 1 to about 5 bara, and the pressure in the second adsorption zone during at least part of steps (ii) and (iii) and in the first adsorption zone during at least part of steps (iv) and (v) is preferably in the range of about 0.1 to about 1 bara. The first predetermined pressure is more preferably in the range of about 0.8 to about 1.2 bara, the second predetermined pressure is more preferably in the range of about 1 to about 2 bara, and the pressure in the second adsorption zone during at least part of steps (ii) and (iii) and in the first adsorption zone during at least part of steps (iv) and (v) is more preferably in the range of about 0.2 to about 0.8 bara.

In another preferred aspect of the embodiment carried out in pairs of adsorption zones, all steps of the process are carried out using a single gas pumping means. In one version of this aspect, the gas pumping means is used to introduce feed gas into the first adsorption zone during step (i) and into the second adsorption zone during steps (vi) and (vii) and is used to remove second component-enriched gas from the second adsorption zone during steps (ii) and (iii) and from the first adsorption zone during steps (iv) and (v). In another version of this aspect, the gas pumping means is used to remove first component-enriched gas from the first adsorption zone during step (i) and from the second adsorption zone during steps (vi) and (vii), and is used to remove second component-enriched gas from the second adsorption zone during steps (ii) and (iii) and from the first adsorption zone during steps (iv) and (v).

In any embodiment of the invention the various adsorption zones may contain different adsorbents. Also, in any embodiment, the feed gas is preferably air, and when the feed gas is air, the second component is preferably nitrogen.

In another preferred aspect of the invention, the system in which the process is carried out has one pair of adsorption zones and one pair of gas reservoirs. In this aspect, the gas transferred cocurrently out of the second adsorption zone during step (i) is charged into a first gas reservoir; the gas transferred cocurrently out of the first adsorption zone during step (ii) is charged into a second gas reservoir; the gas countercurrently transferred to the second adsorption zone during step (iv) is removed from one of the first and second gas reservoirs; and the gas countercurrently transferred to the first adsorption zone during steps (v) and (vi) is removed from the other of the first and second gas reservoirs.

The invention also includes an apparatus embodiment which comprises a system for adsorptively fractionating a feed gas comprising:

(a) a pair of adsorption zones each having an inlet and outlet and each containing an adsorbent which selectively adsorbs the same component or components of the feed gas;

(b) a gas storage container;

(c) gas pumping means having an inlet and an outlet;

(d) adsorption zone exhaust gas conduit means connecting the inlet of each adsorption zone to the gas pumping means inlet, the adsorption zone exhaust gas conduit means including valve means to cut off communication between either or both of the adsorption zone inlets and the gas pumping means inlet;

(e) first feed gas conduit means with valve means connecting a feed gas source to the gas pumping means inlet;

(f) second feed gas conduit means with valve means connecting the feed gas source to each adsorption zone inlet;

(g) adsorption zone feed conduit means connecting the outlet of the gas pumping means to the inlet of each adsorption zone, the adsorption zone feed conduit means including valve means to cut off communication between the gas pumping means outlet and either or both of the adsorption zone inlets;

(h) exhaust gas discharge conduit means with valve means connecting the gas pumping means outlet to an exhaust gas discharge point;

(i) product gas conduit means connecting the outlet of each adsorption zone to a product gas discharge point, the product gas conduit means including valve means to cut off communication between either or both of the adsorption zone outlets and the product gas discharge point;

(j) cross-connection conduit means with valve means connecting the outlets of the adsorption zones; and (k) storage conduit means connecting the outlet of each adsorption zone to the gas storage container, the gas storage conduit means including valve means to cut off communication between either or both of the adsorption zone outlets and the gas storage container.

In a preferred aspect, the apparatus further comprises a second product gas conduit means connecting the outlet of each adsorption zone to the gas pumping means inlet, the second product gas conduit means including valve means to cut off communication between either or both of the adsorption zone inlets and the gas pumping means inlet; and product gas discharge conduit means connecting the gas pumping means outlet to the product gas discharge point, the exhaust gas discharge conduit including valve means. In another preferred aspect, the feed gas is ambient air and the adsorption zones contain adsorbent which selectively adsorbs nitrogen from air.

In a preferred embodiment, the first and second adsorption zones contain different adsorbents.

In another preferred embodiment, the system is provided with first and second gas storage containers; first intermediate storage conduit means connecting the outlet of the first adsorption zone to the first intermediate gas storage container, the first intermediate gas storage means conduit means including valve means to cut off communication between either or both of the adsorption zone outlets and the first intermediate gas storage container; and second intermediate storage conduit means connecting the outlet of the second adsorption zone to the second intermediate gas storage container.

BRIEF DESCRIPTION OF THE DRAWINGS

FIG. 3A–3J are schematic representations of the steps of a preferred adsorption cycle carried out in the adsorption system of FIG. 1 using a single compressor/pump to withdraw nonadsorbed product gas from the adsorption vessels and to withdraw sorbed gas from these vessels.

FIGS. 4A–4J are schematic representations of the steps of a preferred adsorption cycle carried out in the adsorption system of FIG. 1 using a single compressor/pump to charge feed gas into the adsorption vessels and to withdraw sorbed gas from these vessels and using a pair of tanks to hold intermediate storage gas;

The same reference numerals and letters are used to represent the same or similar parts in the various drawings.

DETAILED DESCRIPTION OF THE INVENTION

The invention can be better understood from the accompanying drawings in which the same reference letters or numerals are used to designate the same or similar pieces of equipment in different figures. Auxiliary equipment, including compressors, heat exchangers and valves, not necessary for an understanding of the invention, have been omitted from the drawings to simplify discussion of the invention.

Figure 1:
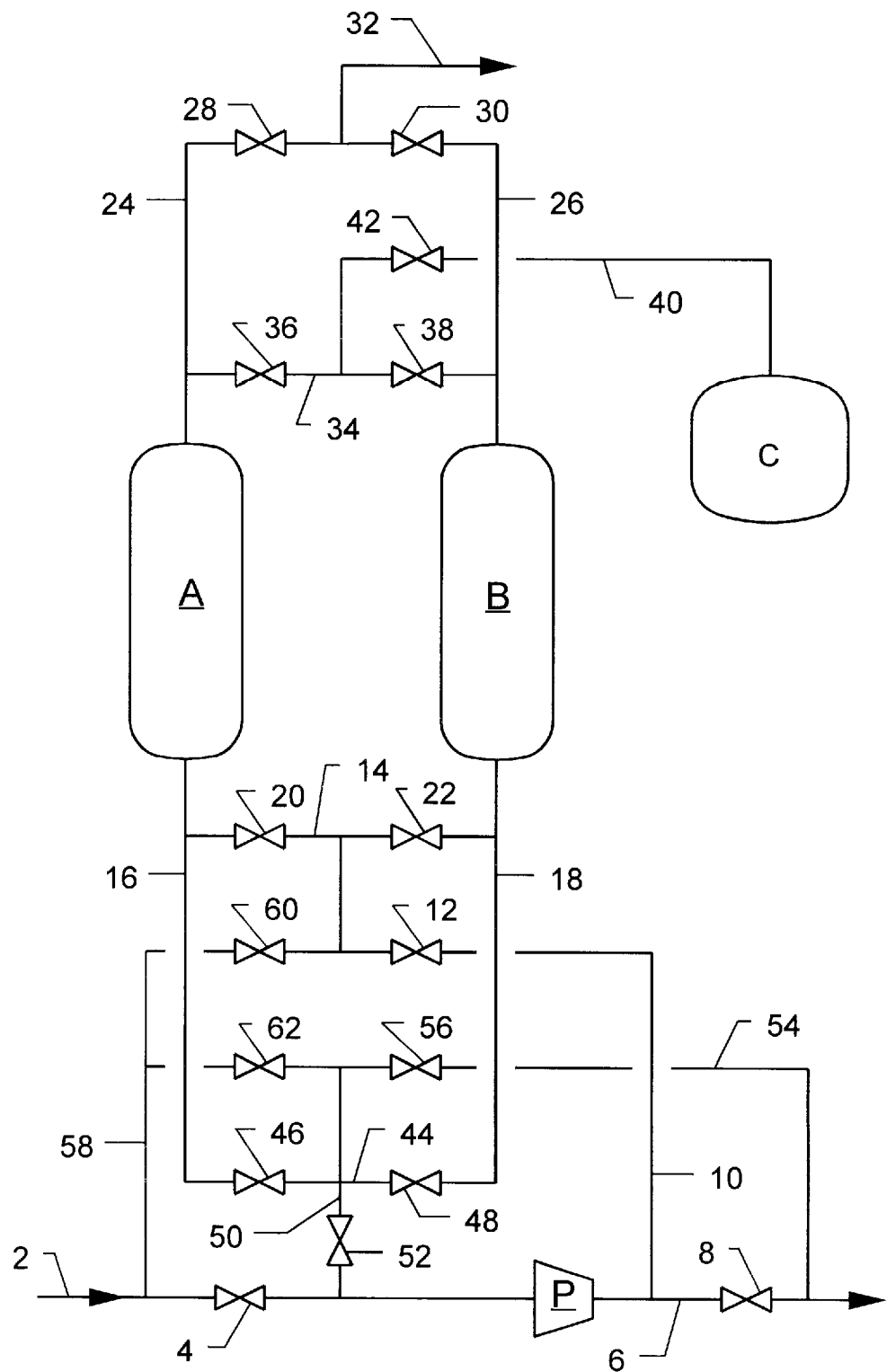
FIG. 1 is a schematic representation of an adsorption system that can be used in one embodiment of the invention.

Turning now to the drawings, and particularly to FIG. 1, there is illustrated therein an adsorption system comprising a pair of adsorption vessels, A and B, arranged in parallel, gas storage container C and gas compressor/pump P, and piping with valves for transporting the various gas streams through the system. Vessels A and B may be the same size or vessel B may be smaller or larger than vessel A. Each of vessels A and B are packed with an adsorbent which selectively adsorbs one or more gas components of the feed gas to the system more readily than it adsorbs one or more other components of the feed gas. Vessels A and B may be packed with the same adsorbent or they may be packed with different adsorbents.

Gas storage tank C is a conventional gas storage vessel; it may be packed with an adsorbent, if desired.

Pump P may be any gas compressor, blower, pump, etc. that is capable of pumping gas into vessels and removing gas from the vessels at the various pressures encountered in the process. Gas pump P preferably operates efficiently at both superatmospheric and subatmospheric pressures since, in preferred embodiments of the invention, it will be used to introduce feed gas into the system at atmospheric or above-atmospheric pressures as well as evacuate vessels A and B during adsorbent regeneration.

In the system of FIG. 1, gas feed line 2, fitted with valve 4, connects a source of feed gas to the inlet end of pump P. Waste gas discharge line 6, provided with valve 8, connects the outlet end of pump P to a waste gas discharge point. Upstream of valve 8, line 10, provided with valve 12, connects line 6 to adsorption vessel inlet manifold 14. Manifold 14 is connected to adsorption vessel inlet lines 16 and 18 via valves 20 and 22. Lines 24 and 26, provided with valves 28 and 30, respectively, join the nonadsorbed gas outlets of vessels A and B to nonadsorbed product gas discharge line 32. Cross-connection line 34 joins lines 24 and 26 via valves 36 and 38, respectively. Intermediate storage tank supply line 40, provided with valve 42 connects tank C to line 34 at a point between valves 36 and 38. Lines 16 and 18 connect the inlet ends of vessels A and B to evacuation manifold 44 via valves 46 and 48, respectively. Manifold 44 is connected to feed line 2 via evacuation line 50, fitted with valve 52. Pump bypass waste gas line 54, provided with valve 56, connects manifold 44 to waste gas discharge line 6 downstream of valve 8. Pump bypass feed gas line 58 connects line 2 to line 10 via valve 60 and to line 54, upstream of valve 56, via valve 62.

Figure 2E:
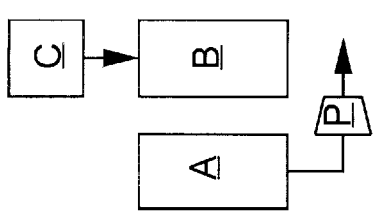
FIGS. 2A–2J are schematic representations of the steps of a preferred adsorption cycle carried out in the adsorption system of FIG. 1 using a single compressor/pump to charge feed gas into the adsorption vessels and to withdraw sorbed gas from these vessels.

The process of the invention will be described as it applies to the separation of air to produce an oxygen-enriched nonadsorbed gas product in the system illustrated in FIG. 1 according to the cycle illustrated in FIGS. 2A–2J. The steps illustrated in FIGS. 2B, 2F and 2I are optional, but they will be included in the described cycle since they are included in the most efficient aspect of the process of the invention. In this embodiment, vessels A and B are packed with a nitrogen-selective adsorbent, such as type A or type X zeolite. The vessels may contain a first bed of desiccant, such as activated alumina or silica gel to remove moisture from the air. Carbon dioxide may also be removed from the air by the desiccant, if it is activated alumina; otherwise, it will generally be adsorbed in the initial portion of the main adsorbent, since it is more strongly adsorbed by the above adsorbents than is nitrogen. Pump P is in service during each step of the cycle. The pressures and step durations stated below are merely exemplary for operation of the described adsorption system to separate air into oxygen-enriched and oxygen-depleted components by the disclosed process. It should be understood, however, that these values are not to be construed as limitative.

During step 1 (FIG. 2A), valves 4, 12, 20, 38 and 42 are initially open and all other valves are closed. Ambient air at atmospheric pressure is drawn into the system through line 2 by pump P and charged into vessel A, thereby causing the pressure to increase in vessel A. When vessel A is pressurized to the desired adsorption pressure, generally in the range of about 1 to about 1.6 bara, valve 28 is opened and oxygen-enriched gas product passes out of the system through lines 24 and 32. The oxygen product gas is generally stored in a storage vessel, from which product is drawn as needed. During this step, vessel B, which has just completed an oxygen-enriched gas production step, undergoes its first depressurization step, reducing the pressure in vessel B to about 1 to about 2 bara. Also, during this step void space gas is cocurrently discharged from vessel B to intermediate storage vessel C. The duration of this step is generally in the range of about 3 to about 10 seconds.

At the completion of step 1, optional step 2 (FIG. 2B) is started, during which valves 38 and 42 are closed and valves 48 and 56 are opened. In this step the cocurrent production of oxygen-enriched gas is continued in vessel A at the desired adsorption pressure while vessel B undergoes its second depressurization step, during which gas contained in vessel B is countercurrently vented to the atmosphere through lines 18, 54 and 6, thereby further reducing the pressure in vessel B to about 1 to about 1.8 bara. This atmospheric vent step permits pump P to continue to be used to force feed air into vessel A. The duration of this step is generally in the range of 0 to about 10 seconds.

When the step 2 is completed, step 3 (FIG. 2C) is initiated, during which valves 8, 36, 42, 48 and 52 are open and all other valves are closed. Vessel A now undergoes its first depressurization step with the cocurrent discharge of void space gas from this vessel to tank C through lines 24, 34 and 40, reducing the pressure in vessel A to about 1 to about 2 bara. Meanwhile, vessel B undergoes its third depressurization to a pressure in the range of about 1.2 to about 0.2 bara, by countercurrent evacuation of gas through lines 18, 50, 2 and 6, using pump P. The duration of this step is generally in the range of about 3 to about 15 seconds.

Figure 2D:
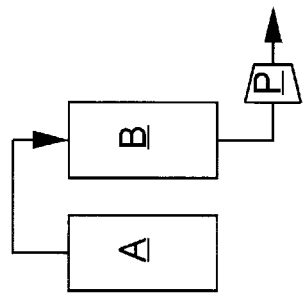
Figure 2C:
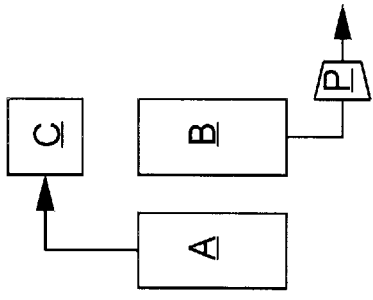
Figure 2B:
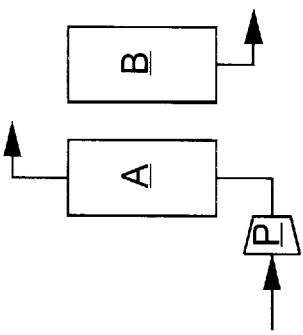
Figure 2A:
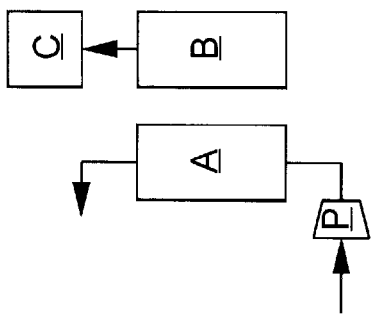
Figure 2J:
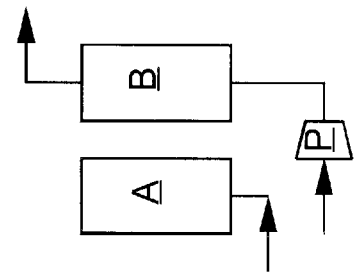
Figure 2I:
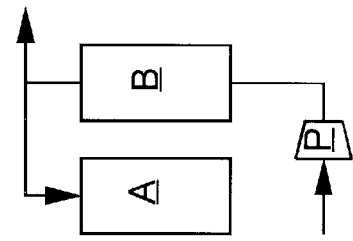

The next step of the process is step 4 (FIG. 2D). For this step, valves 8, 36, 38, 48 and 52 are open and all other valves are closed. Vessel A now undergoes its second depressurization to a pressure of about 0.8 to about 1.8 bara, and vessel B undergoes purge-evacuation by flowing gas cocurrently out of vessel A and countercurrently into and through vessel B, while gas continues to be withdrawn countercurrently from vessel B and discharged to the environment until the pressure in vessel B is reduced to about 0.2 to about 1.0 bara. This step completes the regeneration of adsorbent contained in vessel B. The duration of this step is generally in the range of about 4 to about 15 seconds.

The next step of the process is step 5 (illustrated in FIG. 2E). During this step vessel A undergoes its first countercurrent evacuation of the cycle, to a pressure of about 0.2 bara to about 1.2 bara, using pump P, and vessel B undergoes its first partial pressurization step by flowing gas from storage vessel C countercurrently into vessel B until the pressure in vessel B is in the range of about 0.3 to about 1.0 bara. Only valves 8, 42, 38, 46 and 52 are opened during this step. Gas is evacuated from vessel A through lines 16, 50 and 2 by means of pump P, and is discharged to the environment through line 6. The duration of this step is generally in the range of about 3 to about 15 seconds.

The next step of the process, step 6 (FIG. 2F), is optional. During this step, when employed, valves 8, 30, 46 and 52 are open and all other valves are closed. Vessel A continues to be countercurrently evacuated by pump P through lines 16, 50, 2 and 6, to a pressure of about 0.2 to about 1.0 bara, while vessel B undergoes its second partial pressurization to a pressure of about 0.4 to about 1.0 bara, by the countercurrent flow of oxygen-enriched product gas through lines 32 and 26 and into vessel B. The duration of this step is generally in the range of 0 to about 15 seconds.

During the next step of the process, step 7 (FIG. 2G), only valves 8, 22, 36, 42, 46, 52 and 60 are open. Vessel A is purged by the flow of gas from tank C and countercurrently into vessel A accompanied by the countercurrent evacuation of gas from vessel by pump P through lines 16, 50, 2 and 6 to a final pressure of about 0.2 to about 1.0 bara, while vessel B receives its third partial pressurization of the process by the introduction of ambient air at atmospheric pressure cocurrently into this vessel through lines 2, 58, the tail end of line 10, and lines 14 and 18. The duration of this step is generally in the range of about 4 to about 15 seconds.

Figure 2H:
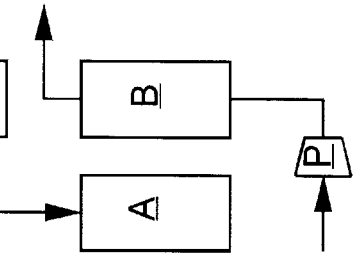
Figure 2G:
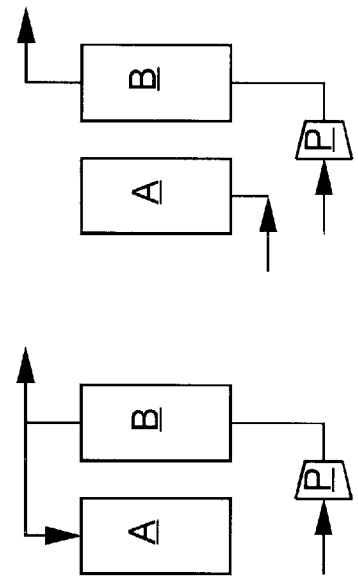
Figure 2F:
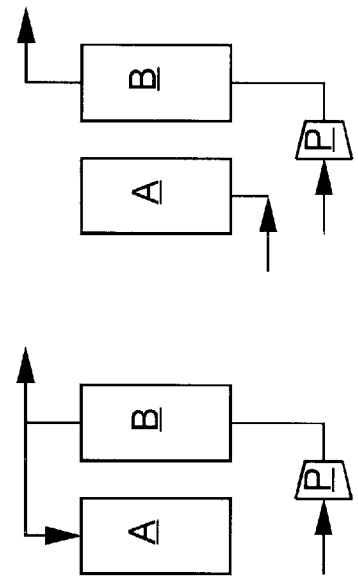

The eighth step of the cycle is shown in FIG. 2H. During this step vessel A receives its first partial repressurization of the cycle, while vessel B undergoes its final repressurization and initiation of production of oxygen-enriched gas product. Generally, for this step, only valves 4, 12, 22, 36 and 42 are initially open, and vessel A is pressurized to a pressure of about 0.3 to about 1.0 bara by the countercurrent flow of gas from storage vessel C through lines 40, 34 and 24, while the pressure in vessel B is raised to the desired adsorption pressure (1 to about 1.6 bara) by cocurrently pumping ambient air thereinto through lines 2, 10, 14 and 18 by means of pump P. When the pressure in vessel B reaches the desired adsorption pressure, valve 30 is opened and oxygen-enriched product gas flows to product storage through line 32. Vessel A continues to receive gas from tank C. The step generally lasts for a period in the range of about 3 to about 15 seconds.

Step 9, illustrated in FIG. 2I, is the third optional step of the process. During this step, vessel A is further pressurized by flowing oxygen-enriched gas thereinto, while vessel B is in production service. Valves 4, 12, 22, 28 and 30 are the only valves open during this step. Oxygen-enriched product gas flows countercurrently into vessel A through line 24 until the pressure in vessel A reaches about 0.4 to about 1.0 bara, while feed air continues to be charged cocurrently into vessel B at the desired adsorption pressure using pump P. The duration of this step is generally in the range of 0 to about 10 seconds.

The tenth and last step of the cycle is the step illustrated in FIG. 2J. During this step, vessel A is further pressurized with ambient air while vessel B continues to be used to produce oxygen-enriched product gas at the desired adsorption pressure. For this step, valves 4, 12, 22, 30, 46 and 62 are open and all other valves are closed. Feed air at ambient pressure flows cocurrently into vessel A through lines 2, 58, 44 and 16, while feed air is charged currently into vessel B at the desired adsorption pressure (about 1.0 to about 2 bara) through lines 2, 6, 10, 14 and 18 and oxygen-enriched gas is discharged cocurrently from vessel B and sent to product storage through lines 26 and 32. The duration of this step is generally in the range of about 4 to about 10 seconds.

The above process has a number of unusual features. First, the process is not symmetrical, i.e. the set of steps conducted in vessel A is not identical to the set of steps carried out in vessel B. Partly because of this, nonadsorbed product gas is not continuously produced. In the process illustrated in FIGS. 2A–2J, nonadsorbed product gas is produced only in the steps 1, 2, 8, 9 and 10. Secondly, the steps of the process are tailored to provide a highly energy efficient cycle. Thus, in steps 7 and 10 ambient air is introduced into the adsorption vessels without using pump P, and in step 2, vessel B is vented without the aid of pump P. This permits pump P to be used for other operations during these steps. A third feature of importance is the continuous use of pump P during the process. Because pump P is used in each step of the process it is never idled. This provides a considerable energy savings. In this respect it is noteworthy that pump P is used to pump feed gas into the adsorption vessels during steps 1, 2, 8, 9 and 10, and it is used to evacuate the adsorption vessels during the steps 3, 4, 5, 6 and 7.

The process carried out in steps 1 to 10 of the FIG. 3 series of steps is identical to that carried out in steps 1 to 10 of FIG. 2, except that in the FIG. 3 system, pump P is used to withdraw oxygen-enriched gas from adsorber A during steps 1 and 2 and from adsorber B during steps 8, 9 and 10, while in steps 1, 2, 8, 9 and 10 of the FIG. 2 series of steps, pump P is used to charge fresh feed into the respective adsorbers. The result is the same except that a lower pressure will be maintained in vessel A during steps 1 and 2 and in vessel B during steps 8, 9 and 10 than will be experienced in these adsorbers during the corresponding steps of the FIG. 2 series of steps.

FIG. 4 illustrates a system similar to the system of FIG. 2, except that two intermediate storage tanks are used in place of the single tank used in the FIG. 2 system. The system of FIG. 4 is particularly useful when the adsorption system is comprised of two adsorbers, such as the system illustrated in FIG. 1, and when it is desired to introduce the gas into the storage tank in such a manner that little or no mixing occurs. This occurs, for example, when the gas is introduced into the storage tank under plug flow conditions, such as when the storage tank is baffled with walled partitions that are parallel to the direction of flow of the gas into and out of the storage tank. The advantage of plug flow operation during transfer of gas to and from the storage tank is that the gas that is first removed from the nonadsorbed outlet end of the adsorption vessels will be most pure in the nonadsorbed gas, and this gas will be returned to the adsorption vessels last. Accordingly, the gas most pure in nonadsorbed gas will always be closest to the nonadsorbed gas outlet end of the adsorption vessels; thus the nonadsorbed product gas removed from the adsorption vessels during the production step will always be of the highest purity with respect to the nonadsorbed gas component.

In the embodiment shown in FIG. 4, tank C is used for the flow of gas to and from vessel A and tank D is used for the flow of gas to and from vessel B. It is not necessary, however, that the gas being returned to the adsorption vessels be returned to the vessel from which it was taken. For example, gas stored in tank C from vessel A in step 3 (FIG. 4C) can be returned to vessel B in the step 5 (FIG. 4E), and the gas stored in vessel D in step 1 (FIG. 4A) can be returned to vessel A in steps 7 and 8 (FIGS. 4G and 4H).

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE 1

This example illustrates use of the process of the invention to separate air into an oxygen-enriched gas product and an oxygen-depleted gas product using the sequence of steps shown in FIG. 2. The example was carried out using two identical cylindrical adsorption vessels 3 inches in diameter and 33 inches long. The adsorption vessels were packed with type X zeolite which had a silicon-to-aluminum atomic ratio of about 1 and which was exchanged with lithium and rare earth ions. (described in detail in U.S. Pat. No. 5,464,467, which is incorporated herein by reference). The system was operated to produce an oxygen-enriched gas product containing 90% by volume oxygen. The step durations, in seconds, and the step end pressures, in bar, absolute (bara), are stated in the Table. Steps 1 to 10 correspond to the steps illustrated FIGS. 2A to 2J, respectively.

TABLE

| Step | Duration, sec | End Pressure Bed A, bara | End Pressure Bed B, bara |
|---|---|---|---|
| 1 | 6 | 1.30 | 1.22 |
| 2 | 4 | 1.54 | 1.05 |
| 3 | 10 | 1.23 | 0.58 |
| 4 | 9 | 1.00 | 0.55 |
| 5 | 7 | 0.61 | 0.72 |
| 6 | 3 | 0.56 | 0.84 |
| 7 | 9 | 0.57 | 1.00 |
| 8 | 3 | 0.75 | 1.17 |
| 9 | 3 | 0.81 | 1.38 |
| 10 | 6 | 1.00 | 1.57 |

The specific product obtained in the above experiment was 43 $Nm^3/Hr/m^3$ (normal cubic meters of nonadsorbed product gas per hour per cubic meter of adsorbent). The yield (defined as the total number of moles of oxygen contained in the nonadsorbed product gas divided by the total number of moles of oxygen contained in the feed gas) was 58%. The calculated power consumption was 0.334 $Kwh/Nm^3O_2$(kilowatt hours per normal cubic meter of oxygen-enriched gas produced).

EXAMPLE 2

The procedure of Example 1 was repeated using the conventional 10-step cycle illustrated in FIG. 4 of U.S. Pat. No. 5,122,164 with a 60 sec. cycle and a pressure swing between 1.5 bara and 0.49 bara. The specific product was 43 $Nm^3Hr/m^3$, the yield was 58% and the calculated power consumption was 0.376 $Kwh/Nm^3O_2$.

A comparison of Examples 1 and 2 shows that the cycle illustrated in FIG. 2 provides substantially the same yield at a considerable savings in power consumption relative to the yield and power consumption obtained using the ten-step cycle described in U.S. Pat. No. 5,122,164.

Although the invention has been described with particular reference to specific equipment arrangements and to specific experiments, these features are merely exemplary of the invention and variations are contemplated. For example, the order of certain of the steps can be reversed. Thus, the steps illustrated in FIGS. 2F, 3F and 4F can precede the steps illustrated in FIGS. 2E, 3E and 4E, respectively or they can follow the steps shown in FIGS. 2J, 3J and 4J, respectively, and the steps illustrated in FIGS. 2I, 3I and 4I can precede the steps illustrated in FIGS. 2H, 3H and 4H, respectively or they can follow the steps shown in FIGS. 2J, 3J and 4J, respectively. Furthermore, the activity taking place in one or both adsorbers during one step may overlap with the activity taking place in one or both adsorbers during the following step. For example, the partial pressurization of vessel A with gas stored in tank C, shown in FIGS. 2H, 3H and 4H, may partially coincide with the vessel A product backfill step shown in FIGS. 2I, 3I and 4I, respectively. The scope of the invention is limited only by the breadth of the appended claims.

What is claimed is:

1. A process for producing first component-enriched gas from a feed gas containing first and second components in a system comprising at least one gas reservoir and at least two adsorption zones each containing an adsorbent which selectively adsorbs said second component, comprising repeatedly performing the steps:

(i) producing first component-enriched gas in one of said adsorption zones by cocurrently introducing feed gas thereinto and cocurrently removing first component-enriched gas therefrom, while partially depressurizing another of said adsorption zones by cocurrently transferring gas therefrom and into said gas reservoir;

(ii) partially depressurizing one of said adsorption zones by cocurrently transferring gas therefrom and into said gas reservoir, while countercurrently removing second component-enriched gas from another of said adsorption zones;

(iii) purging one of said adsorption zones by transferring gas cocurrently out of another adsorption zone and countercurrently into said one of said adsorption zones of this step (iii) while countercurrently withdrawing gas therefrom;

(iv) countercurrently removing second component-enriched gas from one of said adsorption zones, while partially pressurizing another of said adsorption zones by countercurrently transferring gas thereinto from said gas reservoir;

(v) purging one of said adsorption zones other than the adsorption zone purged in step (iii) by countercurrently transferring gas thereinto from said gas reservoir and countercurrently removing second component-enriched gas from said one of said adsorption zones of this step (v), while further pressurizing the adsorption zone partially pressurized in step (iv) by cocurrently introducing feed gas thereinto;

(vi) partially pressurizing one of said adsorption zones by countercurrently transferring gas thereinto from said gas reservoir, while producing first component-enriched gas by cocurrently introducing feed gas into another of said adsorption zones other than said one adsorption zone of step (i) and cocurrently removing first component-enriched gas therefrom; and (vii) further pressurizing the adsorption zone partially pressurized in step (vi) by cocurrently introducing feed gas thereinto, while continuing to cocurrently introduce feed gas into said another of said adsorption zones referred to in step (vi) and cocurrently removing first component-enriched gas therefrom.

2. The process of claim 1, carried out in a system comprising three adsorption zones.

3. The process of claim 1 further comprising, between steps (i) and (ii) the additional step of producing first component-enriched product gas by cocurrently introducing feed gas into said one of said adsorption zones of step (i) and cocurrently removing first component-enriched gas therefrom, while countercurrently removing second component-enriched gas from said another of said adsorption zones of step (i).

4. The process of claim 1 or claim 3 additionally comprising, between steps (iv) and (v), the additional step of countercurrently removing second component-enriched gas from said one of said adsorption zones of step (iv), while partially pressurizing said another of said adsorption zones of step (iv) by countercurrently transferring first component-enriched product gas thereinto, and between steps (vi) and (vii), the additional step of partially pressurizing said one of said first and second adsorption zones of step (vi) by countercurrently transferring first component-enriched product gas thereinto, while producing first component-enriched product gas by cocurrently introducing feed gas into said another of said adsorption zones of step (vi) and cocurrently removing first component-enriched gas therefrom.

5. A process for producing first component-enriched gas from a feed gas containing first and second components in a system comprising at least one gas reservoir and one or more pairs of first and second adsorption zones, each adsorption zone containing an adsorbent which selectively adsorbs said second component, comprising, with respect to each pair of first and second adsorption zones, repeatedly performing the steps:

(i) producing first component-enriched product gas by cocurrently introducing feed gas into said first adsorption zone and cocurrently removing first component-enriched gas therefrom, while partially depressurizing said second adsorption zone by cocurrently transferring gas therefrom and into said gas reservoir;

(ii) partially depressurizing said first adsorption zone by cocurrently transferring gas therefrom and into said gas reservoir, while countercurrently removing second component-enriched gas from said second adsorption zone;

(iii) purging said second adsorption zone by transferring gas cocurrently out of said first adsorption zone and countercurrently into said second adsorption zone while countercurrently removing second component-enriched gas from said second adsorption zone;

(iv) countercurrently removing second component-enriched gas from said first adsorption zone, while partially pressurizing said second adsorption zone by countercurrently transferring gas thereinto from said gas reservoir;

(v) purging said first adsorption zone by countercurrently transferring gas thereinto from said gas reservoir and countercurrently removing gas from said first adsorption zone; while further pressurizing said second adsorption zone by cocurrently introducing feed gas thereinto;

(vi) partially pressurizing said first adsorption zone by countercurrently transferring gas thereinto from said gas reservoir, while producing first component-enriched product gas by cocurrently introducing feed gas into said second adsorption zone and cocurrently removing first component-enriched gas therefrom; and (vii) further pressurizing said first adsorption zone by cocurrently introducing feed gas thereinto, while continuing to produce first component-enriched product gas by cocurrently introducing feed gas into said second adsorption zone and cocurrently removing first component-enriched gas therefrom.

6. The process of claim 5, wherein said system has one pair of adsorption zones.

7. The process of claim 6, wherein said system has first and second gas reservoirs and wherein the gas transferred cocurrently out of said second adsorption zone during step (i) is charged into said first gas reservoir; the gas transferred cocurrently out of said first adsorption zone during step (ii) is charged into said second gas reservoir; the gas countercurrently transferred to said second adsorption zone during step (iv) is removed from one of said first and second gas reservoirs; and the gas countercurrently transferred to said first adsorption zone during steps (v) and (vi) is removed from the other of said first and second gas reservoirs.

8. The process of claim 5, wherein the feed gas is introduced into said second adsorption zone in step (v) and into said first adsorption zone in step (vii) at a first predetermined pressure and the feed gas is introduced into said first adsorption zone in step (i) and into said second adsorption zone in steps (vi) and (vii) at a pressure which increases from said first predetermined pressure to a second predetermined pressure.

9. The process of claim 8, wherein said first predetermined pressure is in the range of about 0.6 to about 2 bara and said second predetermined pressure is in the range of about 1 to about 5 bara.

10. The process of claim 9, wherein the pressure in said second adsorption zone during at least part of steps (ii) and (iii) and in said first adsorption zone during at least part of steps (iv) and (v) is in the range of about 0.1 to about 1 bara.

11. The process of claim 8, wherein said first predetermined pressure is in the range of about 0.8 to about 1.2 bara and said second predetermined pressure is in the range of about 1 to about 2 bara.

12. The process of claim 11, wherein the pressure in said second adsorption zone during at least part of steps (ii) and (iii) and in said first adsorption zone during at least part of steps (iv) and (v) is in the range of about 0.2 to about 0.8 bara.

13. The process of claim 8, wherein said feed gas is air and said first predetermined pressure is atmospheric pressure.

14. The process of claim 13, wherein said second component is nitrogen.

15. The process of claim 14, wherein said first and second adsorption zones contain different adsorbents.

16. The process of claim 8, wherein steps (i) to (vii) are carried out using a single gas pumping means.

17. The process of claim 16, wherein said gas pumping means is used to introduce feed gas into said first adsorption zone during step (i) and into said second adsorption zone during steps (vi) and (vii) and is used to remove second component-enriched gas from said second adsorption zone during steps (ii) and (iii) and from said first adsorption zone during steps (iv) and (v).

18. The process of claim 17, wherein said feed gas is air.

19. The process of claim 18, wherein said second component is nitrogen.

20. The process of claim 16, wherein said gas pumping means is used to remove first component-enriched gas from said first adsorption zone during step (i) and from said second adsorption zone during steps (vi) and (vii) and is used to remove second component-enriched gas from said second adsorption zone during steps (ii) and (iii) and from said first adsorption zone during steps (iv) and (v).

21. The process of claim 20, wherein said feed gas is air.

22. The process of claim 21, wherein said second component is nitrogen.

23. The process of claim 5 further comprising, between steps (i) and (ii) the additional step of producing first component-enriched product gas by cocurrently introducing feed gas into said first adsorption zone and cocurrently removing first component-enriched gas therefrom, while countercurrently removing second component-enriched gas from said second adsorption zone.

24. The process of claim 5 or claim 23 additionally comprising between steps (iv) and (v) the additional step of countercurrently removing second component-enriched gas from said first adsorption zone, while partially pressurizing said second adsorption zone by countercurrently transferring first component-enriched product gas thereinto and between steps (vi) and (vii) the additional step of partially pressurizing said first adsorption zone by countercurrently transferring first component-enriched product gas thereinto, while producing first component-enriched product gas by cocurrently introducing feed gas into said second adsorption zone and cocurrently removing first component-enriched gas therefrom.

25. A system for fractionating a feed gas comprising:
    (a) first and second adsorption zones each having an inlet and outlet and each containing an adsorbent which selectively adsorbs one component of said feed gas;
    (b) a gas storage container having an opening;
    (c) gas pumping means having an inlet and an outlet;
    (d) adsorption zone exhaust gas conduit means connecting the inlet of each adsorption zone to said gas pumping means inlet, said adsorption zone exhaust gas conduit means including valve means to cut off communication between either or both of said adsorption zone inlets and said gas pumping means inlet;
    (e) first feed gas conduit means with valve means connecting a feed gas source and said gas pumping means inlet;
    (f) second feed gas conduit means with valve means connecting said feed gas source and said adsorption zone inlets;
    (g) adsorption zone feed conduit means connecting the outlet of said gas pumping means to the inlet of each adsorption zone, said adsorption zone feed conduit means including valve means to cut off communication between said gas pumping means outlet and either or both of said adsorption zone inlets;
    (h) exhaust gas discharge conduit means with valve means connecting said gas pumping means outlet to an exhaust gas discharge point;
    (i) product gas conduit means connecting the outlet of each adsorption zone to a product gas discharge point, said product gas conduit means including valve means to cut off communication between either or both of said adsorption zone outlets and said product gas discharge point;
    (j) cross-connection conduit means with valve means connecting the outlets of said adsorption zones; and
    (k) intermediate storage conduit means connecting the outlets of each adsorption zone to said opening of said gas storage container, said intermediate gas storage means conduit means including valve means to cut off communication between either or both of said adsorption zone outlets and said opening of said gas storage container.

26. The system of claim 25, further comprising:
    (a) second product gas conduit means connecting the outlet of each adsorption zone to said gas pumping means inlet, said second product gas conduit means including valve means to cut off communication between either or both of said adsorption zone inlets and said gas pumping means inlet; and
    (b) product gas discharge conduit means connecting said gas pumping means outlet to said product gas discharge point, said exhaust gas discharge conduit including valve means.

27. The system of claim 25 or claim 26, wherein said adsorbent selectively adsorbs nitrogen from air.

28. The system of claim 25 or claim 26, wherein the adsorbent in said first adsorption zone is different from the adsorbent in said second adsorption zone.

29. The system of claim 25, provided with first and second intermediate gas storage containers, first intermediate storage conduit means connecting the outlet of said first adsorption zone to said first intermediate gas storage container, said first intermediate gas storage means conduit means including valve means to cut off communication between either or both of said adsorption zone outlets and said first intermediate gas storage container, and second intermediate storage conduit means connecting the outlet of said second adsorption zone to said second intermediate gas storage container, said second intermediate gas storage means conduit means including valve means to cut off communication between either or both of said adsorption zone outlets and said second intermediate gas storage container.

* * * * *